US011247552B2

(12) United States Patent
Follen et al.

(10) Patent No.: US 11,247,552 B2
(45) Date of Patent: Feb. 15, 2022

(54) SYSTEMS AND METHODS OF ENERGY MANAGEMENT AND CONTROL OF AN ELECTRIFIED POWERTRAIN

(71) Applicant: Cummins, Inc., Columbus, IN (US)

(72) Inventors: Kenneth M. Follen, Greenwood, IN (US); Arun Prakash Thunga Gopal, Columbus, IN (US); Vivek A. Sujan, Columbus, IN (US); Pinak Jayant Tulpule, Columbus, IN (US); Mugdha S. Sane, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 256 days.

(21) Appl. No.: 15/749,591

(22) PCT Filed: Aug. 2, 2016

(86) PCT No.: PCT/US2016/045095
§ 371 (c)(1),
(2) Date: Feb. 1, 2018

(87) PCT Pub. No.: WO2017/023898
PCT Pub. Date: Feb. 9, 2017

(65) Prior Publication Data
US 2018/0222309 A1    Aug. 9, 2018

Related U.S. Application Data

(60) Provisional application No. 62/200,459, filed on Aug. 3, 2015.

(51) Int. Cl.
B60K 6/48    (2007.10)
B60W 10/26   (2006.01)
(Continued)

(52) U.S. Cl.
CPC .............. B60K 6/48 (2013.01); B60W 10/06 (2013.01); B60W 10/08 (2013.01); B60W 10/11 (2013.01);
(Continued)

(58) Field of Classification Search
None
See application file for complete search history.

(56) References Cited

U.S. PATENT DOCUMENTS 7,665,559 B2    2/2010  De La Torre-Bueno
7,958,958 B2    6/2011  De La Torre Bueno
(Continued)

FOREIGN PATENT DOCUMENTS

CN    102445927    5/2012
JP    2012-085505   4/2012

OTHER PUBLICATIONS

International Search Report and Written Opinion for International Application No. PCT/US2016/045095, dated Oct. 7, 2016, 10 pages.

Primary Examiner — Faris S Almatrahi
Assistant Examiner — Hongye Liang
(74) Attorney, Agent, or Firm — Foley & Lardner LLP

(57) ABSTRACT

Systems, apparatuses, and methods disclosed provide for receiving internal hybrid vehicle information, external static information, and external dynamic information; determining a propulsion power for the hybrid vehicle at a particular location at a particular time based on at least one of the internal hybrid vehicle information, the external static information, and the external dynamic information, and wherein in response to the determined potential propulsion power, predicting a shift event at the particular location at the particular time; determining a current state of charge of a battery, wherein the battery is operatively coupled to an (Continued)

electric motor in the hybrid vehicle; and managing the state of charge of the battery at the particular location at the particular time based on the current state of charge and the determined propulsion power to eliminate the need for the potential shift event at the particular location at the particular time.

20 Claims, 3 Drawing Sheets

(51) Int. Cl.
*B60W 10/06* (2006.01)
*B60W 10/08* (2006.01)
*B60W 10/11* (2012.01)
*B60W 20/30* (2016.01)
*B60W 20/12* (2016.01)
*B60W 50/00* (2006.01)

(52) U.S. Cl.
CPC ............ *B60W 10/26* (2013.01); *B60W 20/12* (2016.01); *B60W 20/30* (2013.01); *B60W 2050/0075* (2013.01); *B60W 2510/244* (2013.01); *B60W 2552/00* (2020.02); *B60W 2552/20* (2020.02); *B60W 2555/60* (2020.02); *B60W 2556/45* (2020.02); *B60W 2556/50* (2020.02); *B60W 2556/55* (2020.02); *B60W 2556/65* (2020.02); *B60W 2710/1005* (2013.01); *B60W 2710/244* (2013.01); *Y02T 10/62* (2013.01)

(56) References Cited

U.S. PATENT DOCUMENTS

| | | | |
|---|---|---|---|
| 8,036,785 B2 | 10/2011 | Maguire et al. | |
| 8,204,640 B2 | 6/2012 | Tani et al. | |
| 8,340,849 B2 | 12/2012 | Amano et al. | |
| 8,370,012 B2 | 2/2013 | Yamada et al. | |
| 8,374,740 B2 | 2/2013 | Druenert et al. | |
| 8,401,733 B2 | 3/2013 | Weslati et al. | |
| 8,515,607 B2 | 8/2013 | Amano et al. | |
| 8,560,155 B2 | 10/2013 | Kedar-Dongarkar et al. | |
| 8,612,082 B2 | 12/2013 | Hashimoto et al. | |
| 8,613,333 B2 | 12/2013 | Janczak et al. | |
| 8,688,302 B2 | 4/2014 | Sujan et al. | |
| 8,751,083 B2 | 6/2014 | Huntzicker | |
| 8,751,087 B1 | 6/2014 | Dufford | |
| 8,761,981 B2 | 6/2014 | Hussain et al. | |
| 8,839,890 B2 | 9/2014 | Caruso et al. | |
| 8,973,690 B2 | 3/2015 | Yates et al. | |
| 9,043,106 B2 | 5/2015 | Ingram et al. | |
| 9,058,038 B2 | 6/2015 | Zhang et al. | |
| 2007/0179691 A1* | 8/2007 | Grenn | B60W 50/029 701/31.4 |
| 2007/0208467 A1* | 9/2007 | Maguire | G05D 1/0217 701/22 |
| 2010/0042277 A1* | 2/2010 | Naik | B60W 30/18018 701/22 |
| 2011/0246010 A1 | 10/2011 | De La Torre Bueno | |
| 2012/0010767 A1 | 1/2012 | Phillips et al. | |
| 2012/0310471 A1 | 12/2012 | Sengoku et al. | |
| 2013/0131892 A1 | 5/2013 | Hashimoto et al. | |
| 2013/0151044 A1 | 6/2013 | Lee | |
| 2013/0274952 A1 | 10/2013 | Weslati et al. | |
| 2014/0139354 A1 | 5/2014 | Miyazaki | |
| 2014/0232356 A1 | 8/2014 | Kyoung | |
| 2015/0027837 A1 | 1/2015 | Lamba | |
| 2015/0032310 A1 | 1/2015 | Zettel et al. | |
| 2015/0066837 A1 | 3/2015 | Twarog et al. | |
| 2015/0073639 A1 | 3/2015 | Minarcin et al. | |
| 2015/0127199 A1 | 5/2015 | Zhao et al. | |
| 2015/0151736 A1 | 6/2015 | Kim | |
| 2015/0165916 A1 | 6/2015 | Kim et al. | |
| 2015/0175020 A1 | 6/2015 | Kim et al. | |
| 2015/0275787 A1 | 10/2015 | Dufford et al. | |
| 2015/0275788 A1 | 10/2015 | Dufford et al. | |
| 2015/0336458 A1 | 11/2015 | Lee et al. | |
| 2016/0031339 A1 | 2/2016 | Geo | |
| 2016/0046278 A1 | 2/2016 | Matsuzaki et al. | |
| 2016/0052420 A1 | 2/2016 | Kim | |
| 2016/0107634 A1 | 4/2016 | Kim et al. | |
| 2016/0114787 A1 | 4/2016 | Yang et al. | |
| 2016/0129918 A1 | 5/2016 | Skaff et al. | |
| 2016/0167641 A1* | 6/2016 | Yoon | G08G 1/09626 701/22 |

* cited by examiner

SYSTEMS AND METHODS OF ENERGY MANAGEMENT AND CONTROL OF AN ELECTRIFIED POWERTRAIN

CROSS-REFERENCE TO RELATED APPLICATIONS

This application claims the benefit of U.S. Provisional Patent Application No. 62/200,459, filed Aug. 3, 2015, entitled "SYSTEMS AND METHODS OF ENERGY MANAGEMENT AND CONTROL OF AN ELECTRIFIED POWERTRAIN," which is incorporated herein by reference in its entirety.

TECHNICAL FIELD

The present disclosure relates to control strategies of powertrain systems for a vehicle. More particularly, the present disclosure relates to control strategies of electrified powertrain systems for vehicles.

BACKGROUND

In a vehicle, the powertrain or powertrain system refers to the components that provide the power to propel the vehicle. These components include the engine, transmission, drive/propeller shaft, differentials, and final drive. In operation and for an internal combustion engine, the engine combusts a fuel to generate mechanical power in the form of a rotating a crankshaft. The transmission receives the rotating crankshaft and manipulates the engine speed (i.e., the rotation of the crankshaft) to control a rotation speed of the drive/propeller shaft, which is also coupled to the transmission. The rotating drive shaft is received by a differential, which transmits the rotational power to a final drive (e.g., wheels) to effect a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel).

In regard to a hybrid vehicle, conventional hybrid engine systems generally include both an electric motor and an internal combustion engine that are capable of powering the drivetrain in order to propel the car. A hybrid vehicle can have various configurations. For example, in a parallel configuration both the electric motor and the internal combustion engine are operably connected to the drivetrain/transmission to propel the vehicle. In a series configuration, the electric motor is operably connected to the drivetrain/transmission and the internal combustion engine indirectly powers the drivetrain/transmission by powering the electric motor.

In typical operation of the hybrid vehicle, the electric motor is discharged on demand or according to one more predefined control strategies. For example, some hybrid vehicles may turn off the internal combustion engine at prolonged stops and solely use the electric motor to provide the initial acceleration when an acceleration demand is commanded. While effective, these conventional hybrid vehicles use static control methodologies that leave more robust energy management and control strategies to be desired.

SUMMARY

One embodiment relates to an apparatus. The apparatus includes an internal information module structured to receive internal information regarding operation of a hybrid vehicle. The apparatus also includes an external static information module structured to obtain external static information for a route of the vehicle, wherein the external static information is based on a position of the hybrid vehicle on the route. The apparatus further includes an external dynamic information module structured to receive external dynamic information for the route of the hybrid vehicle, wherein the external dynamic information is based on the position and a time of travel of the hybrid vehicle at the position. The apparatus yet further includes a transmission module communicably coupled to each of the internal information module, the external static information module, and the external dynamic information module, wherein the transmission module is structured to determine a potential propulsion power for the hybrid vehicle at a particular location for a particular time on the route based on at least one of the internal information, the external static information, and the external dynamic information, and wherein in response to the determined potential propulsion power, the transmission module is structured to predict a shift event at the particular location at the particular time. The apparatus still further includes a battery state of charge module communicably coupled to the transmission module, wherein the battery state of charge module is structured to manage a state of charge of a battery of the hybrid vehicle at the particular location at the particular time to substantially meet the determined potential propulsion power without a change in a current or predefined operating condition of a powertrain component of the hybrid vehicle. According to one embodiment, the battery state of charge module is structured to manage the state of charge to avoid implementation of a predicted shift event for the transmission at the particular location and at the particular time.

Another embodiment relates to an apparatus. The apparatus includes a transmission module communicably coupled to at least one of an internal information module, an external static information module, and an external dynamic information module, wherein the transmission module is structured to determine a potential propulsion power for the hybrid vehicle at a particular location on the route based on information from at least one of the internal information module, the external static information module, and the external dynamic information module, and wherein in response to the determined potential propulsion power, the transmission module is structured to predict a shift event at the particular location. The apparatus further includes a battery state of charge module communicably coupled to the transmission module, wherein the battery state of charge module is structured to manage a state of charge of a battery of the hybrid vehicle at the particular location to substantially meet the determined potential propulsion power without a change in a current or predefined operating condition of a powertrain component of the hybrid vehicle.

Still another embodiment relates to a method. The method includes receiving, by a controller of a hybrid vehicle, internal hybrid vehicle information, external static information, and external dynamic information; determining, by the controller of the hybrid vehicle, a propulsion power for the hybrid vehicle at a particular location at a particular time based on at least one of the internal hybrid vehicle information, the external static information, and the external dynamic information; in response to the determined propulsion power, predicting, by the controller, a potential shift event for a transmission of the hybrid vehicle at the particular location at the particular time; determining, by the controller, a current state of charge of a battery, wherein the battery is operatively coupled to an electric motor in the hybrid vehicle; and managing, by the controller, the state of charge of the battery at the particular location at the particular time based on the current state of charge and the determined propulsion power to eliminate the need for the potential shift event at the particular location at the particular time.

Yet another embodiment relates to a method. The method includes receiving, by a controller of a hybrid vehicle, internal hybrid vehicle information, external static information, and external dynamic information; determining, by the controller, a potential failure condition in one or more powertrain components of the hybrid vehicle based on the internal hybrid vehicle information; and managing, by the controller, a state of charge of the battery during operation of the hybrid vehicle to reduce demand from the one or more powertrain components.

Still a further embodiment relates to a system. The system includes a battery for use in a hybrid vehicle and a controller communicably and operatively coupled to the battery. According to one embodiment, the controller is structured to: determine a propulsion power for the hybrid vehicle at a particular location based on at least one of internal hybrid vehicle information, external static information, and external dynamic information; in response to the determined propulsion power, predict a potential shift event for a transmission of the hybrid vehicle at the particular location; determine a current state of charge of the battery; and manage the state of charge of the battery at the particular location based on the current state of charge and the determined propulsion power to skip the potential shift event at the particular location These and other features, together with the organization and manner of operation thereof, will become apparent from the following detailed description when taken in conjunction with the accompanying drawings.

DETAILED DESCRIPTION OF VARIOUS EMBODIMENTS

Figure 1:
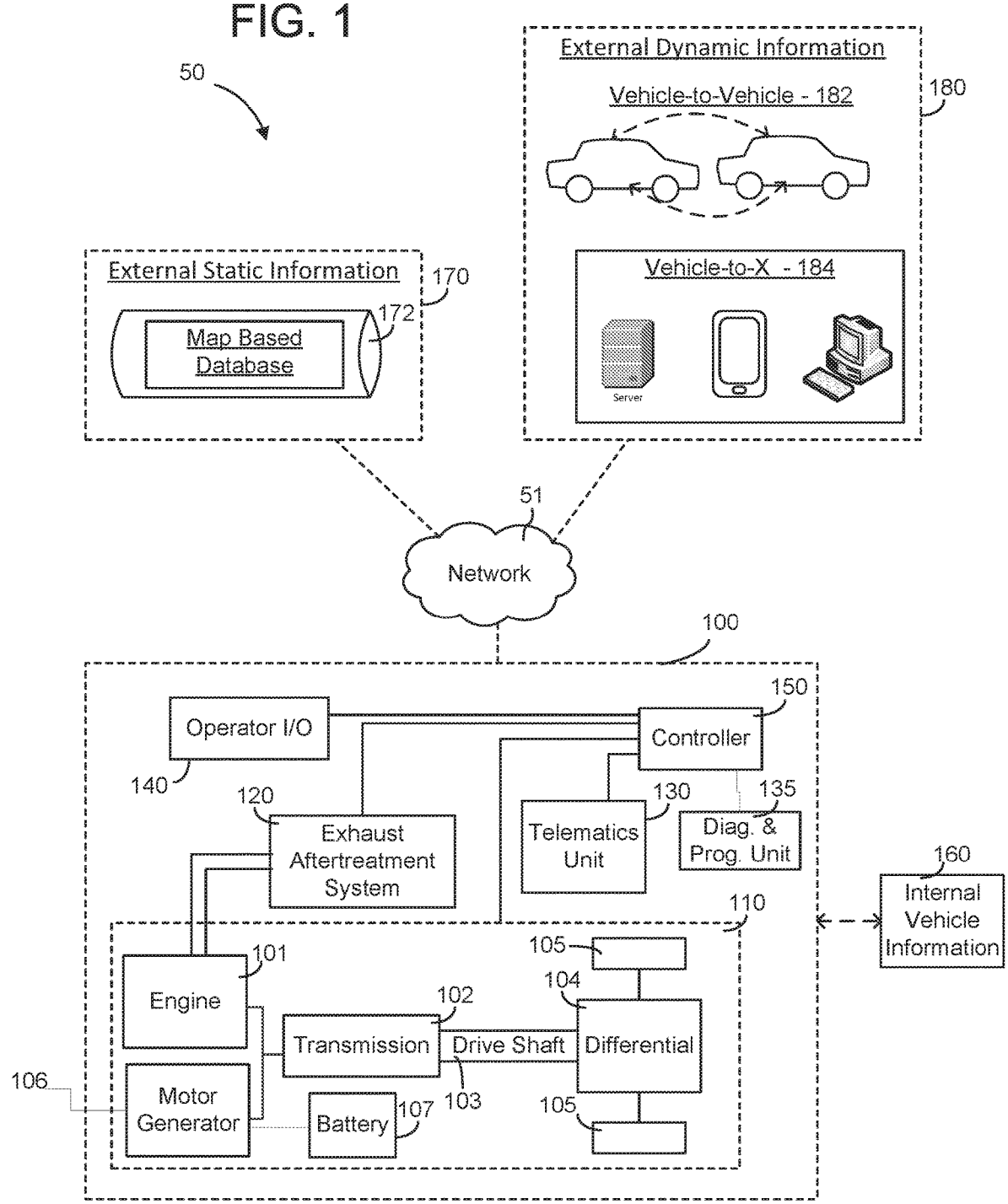
FIG. 1 is a schematic diagram of an intelligent transportation system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods of managing and controlling a battery state of charge to meet a determined and/or predicted power output based on internal vehicle information, static external vehicle information (e.g., information that may change with distance but not with time), and dynamic external vehicle information (e.g., information that may change with time) for at least a partial hybrid vehicle (e.g., a vehicle that has an electrified powertrain). According to the present disclosure, a controller may be communicably coupled with one or more external data providing sources (e.g., a telematics system provider, another vehicle via a Vehicle-to-Vehicle network, a Vehicle-to-X network, etc.), such that the controller may receive data and have a knowledge of one or more upcoming conditions for the vehicle. Based on these conditions, the controller may determine a power output required or that may be required to traverse these conditions. Based on the determined power output, the controller may predict a need for a potential shift event in the transmission of the vehicle. In response, the controller may adjust, manage, or otherwise control a battery state of charge for managing the power output from the electric motor to impact the control of a powertrain component, such as the transmission in the vehicle. For example, the controller may receive data indicative of an upcoming hill and in response determine the power to traverse the hill at a predefined vehicle speed. Rather than commanding a shift event (e.g., a downshift) to traverse the hill, the controller may provide a command to increase the battery state of charge before the hill to provide the electric motor with an ability to supplement the internal combustion engine power output to meet or substantially meet the determined and/or predicted power output on the hill. In this regard, the shift event may be avoided. Advantageously, this operation may lead to an enhanced driver experience, especially in regard to new or relatively new manual transmission operators who may otherwise struggle to find the appropriate transmission setting for the hill traversal.

In additional embodiments, the controller of the present disclosure may also manage the wear and tear on one or more power train components by managing the battery state of charge in connection with controlling the electric motor power output. In this regard and for example, if the controller receives internal vehicle information that is indicative of a potential imminent fail condition for the transmission, the controller may command additional state of charge for the battery to tax the transmission relatively less by having enhanced power output to avoid or reduce the need for shift events. These and other features of the present disclosure are described more fully herein below.

As used herein, the term "shift event" refers to the transmission undergoing a shift (i.e., a change in transmission setting) to manipulate the speed of the drive/propeller shaft relative to the engine speed. As transmissions vary from geared to continuous configurations (e.g., continuous variable transmission), the term "shift event" is not limited to just an increase or decrease in gears (e.g., $3^{rd}$ to $2^{nd}$ gear). Rather, the term "shift event" encompasses any type of engine speed manipulation (setting) performed by the transmission. For example, a shift event in a continuous variable transmission indicates either an increase/decrease in the ratio of input-to-output pulley. As such, the term "shift event" applies to any type of transmission.

As also used herein, the phrase "state of charge" (SOC) refers to the charge level of the battery (i.e., a current battery capacity versus the maximum battery capacity, usually expressed as a percentage). As also used herein, "battery capacity" refers to the amount of charge a battery can deliver for a specific amount of time (expressed in ampere-hours). For example, a 100 ampere-hours capacity refers to a battery that can deliver 5 amperes for 20 hours (5 amperes*20 hours=100 ampere-hours). As also used herein, the phrase "battery life" refers to at least one of a shelf life of a battery (i.e., how long a battery can remain operational before not satisfying specific performance criteria) and a cycle life of a battery (i.e., how many charge-discharge cycles a battery can endure before not satisfying specific performance criteria). Specific performance criteria may include any predefined acceptable operating range for the battery. For example, a battery that is only capable of 75 ampere-hours from its original 100 ampere-hours may be deemed to not meet the minimum performance criteria of 80 ampere-hours. The acceptable performance criteria may be defined in regard to other variables and/or characteristics of the battery as well. Also, as used herein, the phrase "state of health" (SOH) refers to the current state of battery life. Whereas SOC refers to the current level of charge in the battery, the SOH refers to the amount of charge a battery can hold (typically, expressed as a percentage in relation to an original amount of charge capacity of the battery).

Referring now generally to FIG. 1, a schematic diagram of an intelligent transportation system is shown according to one embodiment. The intelligent transportation system (ITS) 50 is structured to provide an environment that facilitates and allows the exchange of information or data (e.g., communications) between a vehicle, such as vehicle 100, and one or more other components or sources. In this regard and for example, the ITS 50 may include telematics systems that facilitate the acquisition and transmission of data acquired regarding the operation of the vehicle 100. As shown and generally speaking, the ITS 50 includes a vehicle 100 communicably coupled via a network 51 to each of an external static information source 170 and an external dynamic information source 180, a component or system outside of the vehicle 100. The information/data may be stored inside or outside of the vehicle 100.

The network 51 may be any type of communication protocol that facilitates the exchange of information between and among the vehicle 100 and the external static and dynamic information sources 170 and 180. In this regard, the network 51 may communicably couple the vehicle 100 with each of the external static and dynamic information sources 170 and 180. In one embodiment, the network 51 may be configured as a wireless network. In this regard, the vehicle 100 may wirelessly transmit and receive data from at least one of the external static and dynamic information sources 170 and 180. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 150 and/or telematics unit 130 of the vehicle 100 may electrically, communicably, and/or operatively couple via fiber optic cable to the network 51 to selectively transmit and receive data wirelessly to and from at least one of the external static and dynamic information sources 170 and 180.

The external static information source 170 may be any information (e.g., data, value, etc.) provider capable of providing external static information, where external static information refers to information or data that may vary as a function of position (e.g., the grade of the road may vary along a route) but is substantially unchanging with respect to time. In this regard, the external static information source 170 may include one or more map based databases 172, where the map based database 172 includes static information including, but not limited to, road grade data (e.g., the road grade at various spots along various routes), speed limit data (e.g., posted speed limits in various road locations), elevation or altitude data at various points along a route, curvature data at various points along a route, location of intersections along a route, etc. It should be understood that the present disclosure contemplates other sources of external static information (e.g., a global positioning system satellite that provides latitude, longitude, and/or elevation data), such that the database configuration is not meant to be limiting or intended to be the only type of static information source contemplated.

The external dynamic information source 180 may be any external dynamic information (e.g., data, value, etc.) provider, where external dynamic information refers to information or data that may vary as a function of both time and location (e.g., construction speed limits). In this regard, the external dynamic information source 180 may include any source capable of providing the external dynamic information. Accordingly, the external dynamic information source 180 may include vehicle-to-vehicle 182 communications. In this regard, the vehicle 100 may communicate with one or more other vehicles directly (e.g., via NFC, etc.) to obtain data regarding one or more upcoming conditions for the vehicle 100. In another embodiment, the external dynamic information source 182 may include a vehicle-to-X 184 configuration, where the "X" refers to any remote information providing source. For example and as shown in FIG. 1, the remote information providing source may include one or more servers, computers, mobile devices, etc. Accordingly, the external dynamic information may include, but is not limited to, a traffic density at a particular location at a particular time, a weather condition at a particular location at a particular time, etc. Like the external static information sources 170, it should be understood that the present disclosure contemplates other sources of external dynamic information sources, such that the depicted examples are not meant to be limiting or intended to be the only type of dynamic information source contemplated.

Referring now to the vehicle 100 of FIG. 1, the vehicle 100 is communicably coupled with each of the external static and dynamic sources 170, 180 via the network 51. In the embodiment depicted, the vehicle 100 is structured as a hybrid vehicle having an internal combustion engine 101 power source and a motor/generator 106 power source. The vehicle 100 may be configured as any type of hybrid-powered vehicle (e.g., a full electric vehicle, a plug-in hybrid vehicle, etc.). As such, the vehicle 100 may be configured as an on-road or an off-road vehicle including, but not limited to, line-haul trucks, mid-range trucks (e.g., pick-up truck), tanks, airplanes, and any other type of vehicle that utilizes a transmission. Before delving into the particulars of the ITS 50 in regard to the vehicle 100, the various components of the vehicle 100 may be described as follows. The vehicle 100 is shown to generally include a powertrain system 110, an exhaust aftertreatment system 120, a telematics unit 130, a diagnostic and prognostic unit or system 135, an operator input/output (I/O) device 140, and a controller 150, where the controller 150 is communicably coupled to each of the aforementioned components.

The powertrain system 110 facilitates power transfer from the engine 101 and/or motor generator 106 to power and/or propel the vehicle 100. The powertrain system 110 includes an engine 101 and a motor generator 106 operably coupled to a transmission 102 that is operatively coupled to a drive shaft 103, which is operatively coupled to a differential 104, where the differential 104 transfers power output from the engine 101 and/or motor generator 106 to the final drive (shown as wheels 105) to propel the vehicle 100. In this regard, the powertrain system 110 is structured as an electrified powertrain. The electrified powertrain includes the motor generator 106, where the motor generator 106 may include a torque assist feature, a regenerative braking energy capture ability, a power generation ability, and any other feature of motor generators used in hybrid vehicles. In this regard, the motor generator 106 may be any conventional motor generator that is capable of generating electricity and produce a power output to drive the transmission 102. Accordingly, the motor generator 106 may include one or more power conditioning devices such as an inverter and a motor controller. The electrified powertrain may also include any one or more of several electrified accessories including, but not limited to, an electrically driven/controlled air compressor, an electrically driven/controlled engine cooling fan, an electrically driven/controlled heating, venting and air conditioning system, an alternator, etc., where the controllability may stem from the controller 150. It should be understood that the present disclosure contemplates any and all other types of electrically-powered accessories that may be a part of the powertrain system 110 and/or separate from the powertrain system 110 but included in the vehicle 100.

As a brief overview, the engine 101 receives a chemical energy input (e.g., a fuel such as gasoline or diesel) and combusts the fuel to generate mechanical energy, in the form of a rotating crankshaft. In comparison, the motor generator 106 may be in a power receiving relationship with an energy source, such as battery 107 that provides an input energy (and stores generated electrical energy) to the motor generator 106 for the motor generator 106 to output in form of useable work or energy to in some instances propel the vehicle 100 alone or in combination with the engine 101. In this configuration, the hybrid vehicle 100 has a parallel drive configuration. However, it should be understood, that other configuration of the vehicle 100 are intended to fall within the spirit and scope of the present disclosure (e.g., a series configuration and non-hybrid applications, such as a full electric vehicle, etc.). As a result of the power output from at least one of the engine 101 and the motor generator 106, the transmission 102 may manipulate the speed of the rotating input shaft (e.g., the crankshaft) to effect a desired drive shaft 103 speed. The rotating drive shaft 103 is received by a differential 104, which provides the rotation energy of the drive shaft 103 to the final drive 105. The final drive 105 then propels or moves the vehicle 100.

The engine 101 may be structured as any internal combustion engine (e.g., compression-ignition or spark-ignition), such that it can be powered by any fuel type (e.g., diesel, ethanol, gasoline, etc.). Similarly, although termed a 'motor generator' 106 throughout the pages of the disclosure, thus implying its ability to operate as both a motor and a generator, it is contemplated that the motor generator component, in some embodiments, may be an electric generator separate from the electric motor of the hybrid vehicle 100. Furthermore, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

Moreover, the battery 107 may be configured as any type of rechargeable (i.e., primary) battery and of any size. That is to say, the battery 107 may be structured as any type of electrical energy storing and providing device, such as one or more capacitors (e.g., ultra capacitors, etc.) and/or one or more batteries typically used or that may be used in hybrid vehicles (e.g., Lithium-ion batteries, Nickel-Metal Hydride batteries, Lead-acid batteries, etc.). The battery 107 may be operatively and communicably coupled to the controller 150 to provide data indicative of one or more operating conditions or traits of the battery 107. The data may include a temperature of the battery, a current into or out of the battery, a number of charge-discharge cycles, a battery voltage, etc. As such, the battery 107 may include one or more sensors coupled to the battery 107 that acquire such data. In this regard, the sensors may include, but are not limited to, voltage sensors, current sensors, temperature sensors, etc.

As also shown, the vehicle 100 includes an exhaust aftertreatment system 120 in fluid communication with the engine 101. The exhaust aftertreatment system 120 receives the exhaust from the combustion process in the engine 101 and reduces the emissions from the engine 101 to less environmentally harmful emissions (e.g., reduce the NOx amount, reduce the emitted particulate matter amount, etc.). The exhaust aftertreatment system 120 may include any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor). It should be understood that other embodiments may exclude an exhaust aftertreatment system and/or include different, less than, and/or additional components than that listed above. All such variations are intended to fall within the spirit and scope of the present disclosure.

The vehicle 100 is also shown to include a telematics unit 130. The telematics unit 130 may be structured as any type of telematics control unit. Accordingly, the telematics unit 130 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 130 and one or more remote devices (e.g., a provider/manufacturer of the telematics device, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 130 may also include a communications interface for communicating with the controller 150 of the vehicle 100. The communication interface for communicating with the controller 150 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 150 and the telematics unit 130. In other embodiments, a local area network (LAN), a wide area network (WAN), or an external computer (for example, through the Internet using an Internet Service Provider) may provide, facilitate, and support communication between the telematics unit 130 and the controller 150. In still another embodiment, the communication between the telematics unit 130 and the controller 150 is via the unified diagnostic services (UDS) protocol. All such variations are intended to fall within the spirit and scope of the present disclosure.

The vehicle 100 is also shown to include diagnostic and prognostic system 135. In one embodiment, the diagnostic and prognostic system 135 may be configured as any type of on-board detection system (e.g., OBD II, OBD I, EOBD, JOBD, etc.). In another embodiment, the diagnostic and prognostic system 135 may be any type of diagnostic and prognostic system included with vehicles. Accordingly, the diagnostic and prognostic system 135 may be communicably coupled to one or more sensors, physical or virtual, positioned throughout the vehicle 100 such that the diagnostic and prognostic system 135 may receive date indicative of one or more fault conditions, potential symptoms, operating conditions to determine a status of a component (e.g., healthy, problematic, malfunctioning, etc.). If the diagnostic and prognostic system 135 detects a fault, the diagnostic and prognostic system 135 may trigger a fault code and provide an indication to the operator input/output device 140 of the vehicle (e.g., a check engine light, etc.).

The operator input/output device 140 enables an operator of the vehicle to communicate with the vehicle 100 and the controller 150. For example, the operator input/output device 140 may include, but is not limited, an interactive display (e.g., a touchscreen, etc.), an accelerator pedal, a clutch pedal, a shifter for the transmission, a cruise control input setting, etc. Via the input/output device 140, the operator can designate preferred characteristics of one or more vehicle parameters.

As shown, the controller 150 is communicably coupled to the powertrain system 110, the exhaust aftertreatment system 120, the telematics unit 130, the diagnostic and prognostic system 135, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data (e.g., instructions, commands, signals, values, etc.) from one or more of the components shown in FIG. 1. This may generally be referred to as internal vehicle information 160 (e.g., data, values, etc.).

The internal vehicle 160 information represents determined, acquired, predicted, estimated, and/or gathered data regarding one or more components in vehicle 100.

Accordingly, the internal vehicle information 160 may include data regarding the battery 107. As mentioned above, the data regarding the battery 107 may include, but is not limited to, a temperature of the battery, a current into or out of the battery, a number of charge-discharge cycles, a battery state of charge, a battery voltage, etc. The internal vehicle information 160 may also include information from the diagnostic and prognostic system 135, which may include, but is not limited to, one or more fault codes, data identifiers, diagnostic trouble codes, and so on. The internal vehicle information 160 may also include data regarding the motor generator 106. Data regarding the motor generator 106 may include, but is not limited to, a power consumption rate, a power output rate, an hours of operation amount, a temperature, etc. The internal vehicle information 160 may also include other data regarding the powertrain system 110 (and other components in the vehicle 100). For example, the data regarding the powertrain system 110 may include, but is not limited to, the vehicle speed, the current transmission gear/setting, the load on the vehicle/engine, the throttle position, a set cruise control speed, data relating to the exhaust aftertreatment system 120, output power, engine speed, fluid consumption rate (e.g., fuel consumption rate, diesel exhaust fluid consumption rate, etc.), any received engine/vehicle faults (e.g., a fault code indicating a low amount of diesel exhaust fluid), engine operating characteristics (e.g., whether all the cylinders are activated or which cylinders are deactivated, etc.), etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst).

The internal vehicle information may be stored by the controller 150 and selectively transmitted to one or more desired sources (e.g., another vehicle such as in a vehicle-to-vehicle communication session, a remote operator, etc.). In other embodiments, the controller 150 may provide the internal vehicle information 160 to the telematics unit 130 whereby the telematics unit transmits the internal vehicle information 160 to one or more desired sources (e.g., a remote device, an operator of the telematics unit, etc.). All such variations are intended to fall within the spirit and scope of the present disclosure.

In this regard because the components of FIG. 1 are shown to be embodied in a vehicle 100, the controller 150 may be structured as an electronic control module (ECM). The ECM may include a transmission control unit and any other control unit included in a vehicle (e.g., exhaust aftertreatment control unit, engine control module, powertrain control module, etc.). The function and structure of the controller 150 are shown described in greater detail in FIG. 2.

Figure 2:
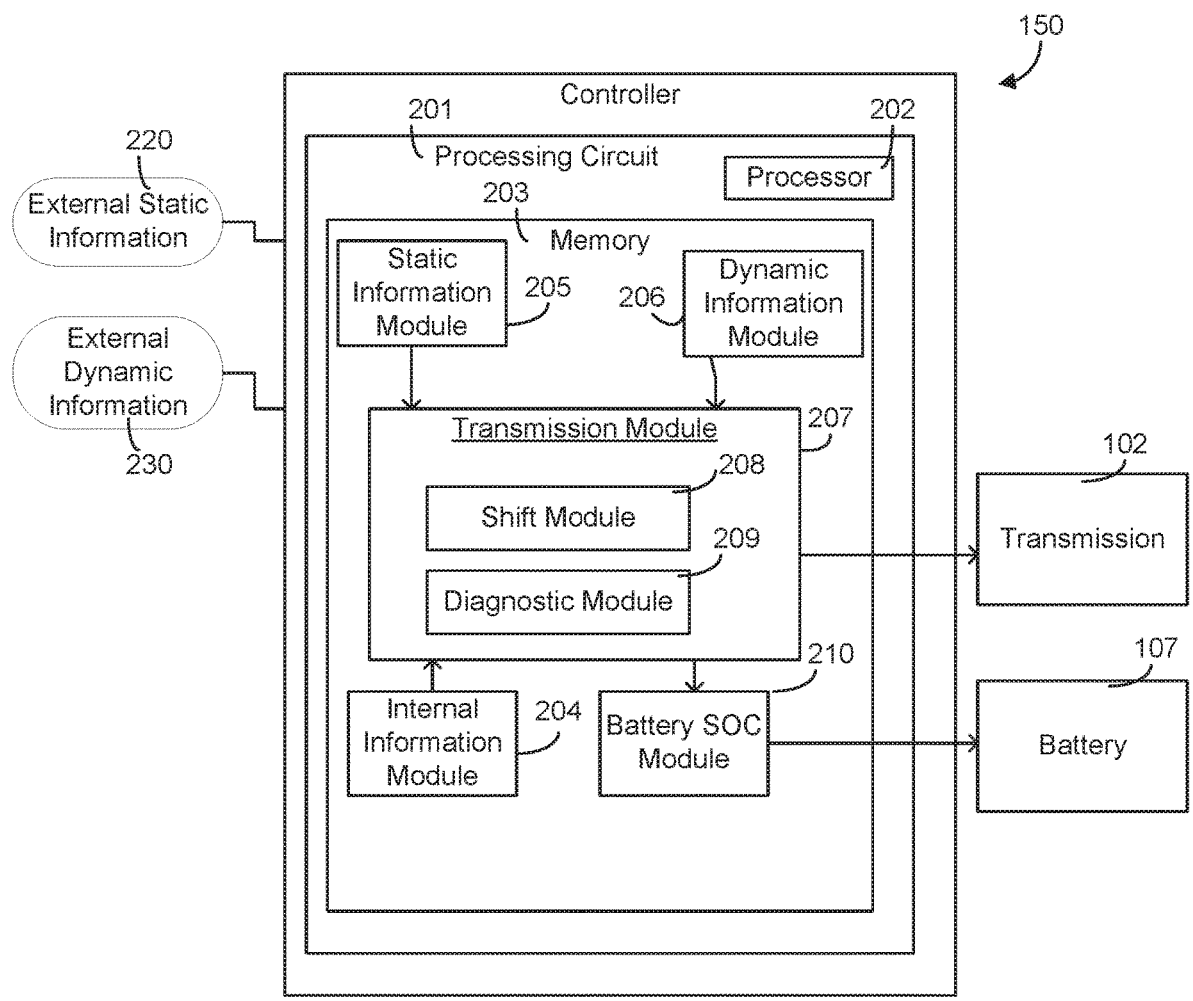
FIG. 2 is a schematic diagram of the controller used with the vehicle of FIG. 1, according to an example embodiment.

Accordingly, referring now to FIG. 2, the function and structure of the controller 150 are shown according to one example embodiment. The controller 150 is shown to include a processing circuit 201 including a processor 202 and a memory 203. The processor 202 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 203 (e.g., NVRAM, RAM, ROM, Flash Memory, hard disk storage, etc.) may store data and/or computer code for facilitating the various processes described herein. Thus, the one or more memory devices 203 may be communicably connected to the controller 150 and provide computer code or instructions to the controller 150 for executing the processes described in regard to the controller 150 herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 is shown to include various modules for completing the activities described herein. More particularly, the memory 203 includes an internal information module 204, a static information module 205, a dynamic information module 206, and a battery SOC module 210, all of which are communicably coupled to a transmission module 207. The modules are adapted to manage a SOC of the battery 107 to meet or substantially meet a requested or predicted power and energy demand based on at least one piece of internal vehicle information, external static information, and external dynamic information in accord with a prescribed objective function (e.g., minimize fuel consumption, minimize emissions, etc.) and to, in one embodiment, alleviate a need for a predicted a shift event. In another embodiment, the frequency of shift events may be reduced. While various modules with particular functionality are shown in FIG. 2, it should be understood that the controller 150 and memory 203 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

The phrase "substantially meet" in regard to meeting a requested or predicted potential propulsion power is meant to be broadly interpreted. In one embodiment, the phrase "substantially meet" refers to staying in the same transmission setting (prior to the particular location) even if the engine output power changes at the particular location and time. In another embodiment, the phrase "substantially meet" refers to accomplishing the mission criteria (e.g., getting to the particular location or end spot, an emissions criteria, an acceleration criteria, etc.) even while running the battery down as long as the mission is achieved. In still another embodiment, the phrase "substantially meet" refers to a nominal value or tolerance with respect to the determined propulsion power (e.g., if the determined propulsion power is X, then substantially meet may mean X+/−5% of X, etc.). Those of ordinary skill in the art will appreciate that many different definitions of the phrase "substantially meet" are intended to fall within the spirit and scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The internal information module 204 is structured to receive, gather, and/or acquire internal vehicle information. In one embodiment, the internal information module 204 includes one or more data acquisition devices within the vehicle 100, such as the diagnostic and prognostic system 135, that facilitate acquisition of the internal vehicle information. In another embodiment, the internal information module 204 includes communication circuitry for facilitating reception of the internal information. In still another embodiment, the internal information module 204 includes machine-readable content for receiving and storing the internal information. In yet another embodiment, the internal information module 204 includes any combination of data acquisition devices, communication circuitry, and machine readable content. As mentioned above, the internal information may include any type of internal information regarding the vehicle 100 and from the vehicle 100 itself (e.g., a vehicle speed, a load on the vehicle, a torque output, a transmission setting, an engine temperature, one or more fault codes or a history of fault codes, etc.). The internal information module 204 is structured to provide the acquired and/or gathered internal information to the powertrain component module 207.

The static information module 205 is structured to receive, gather, and/or acquire external static information 220 from one or more external static information sources (e.g., the map database 172) and provide or transmit the external static information to the powertrain component module 207. The static information module 205 may also store the received external static information, where the storage configuration may be variable from application-to-application (e.g., store external static information for the past thirty days, etc.). In this regard, the static information module 205 may correlate various pieces of static information with frequently traveled routes for the vehicle 100 in order to facilitate fast retrieval and use. For example, if an operator frequently travels (e.g., once a month) from Wisconsin to Florida, the static information may include toll locations, intersections, speed limits, road grade, etc. for various parts along the route. Advantageously, this information may be recalled by the static information module 205 to provide to the transmission module 207 on-demand. As mentioned above, the static information may include any piece of information or data that is static in nature (e.g., unchanging with respect to location, such as the road grade at a various location). Accordingly, the static information module 205 may include communication circuitry or other communication devices that facilitate the acquisition and reception of the external static information 220. In another embodiment, the static information module 205 may include machine readable content for facilitating the acquisition and reception of the external static information 220. In yet another embodiment, the static information module 205 may include any combination of hardware (e.g., communication components) and machine-readable content.

The dynamic information module 206 is structured to receive, acquire, and/or gather external dynamic information 230 from one or more external dynamic information sources (e.g., a remote device, another vehicle, an infrastructure component, etc.). As mentioned above, the external dynamic information 230 may include any information or data that may change with respect to time and distance (e.g., the dynamic speed limits at construction sites, etc.). In response, the dynamic information module 206 is structured to transmit or provide the received external dynamic information 240 to the transmission module 207. Similar to the static information module 205, the dynamic information module 206 may include one or more configurability options that dictate how long various pieces of dynamic information are stored. For example, the dynamic speed limit may be measured at a certain rate at a certain time and location, which is stored by the dynamic information module 206. The dynamic information module 206 may update the stored dynamic speed limit upon a manual update from the operator (e.g., a refresh input received via the I/O device 140) and/or upon a configuration that dictates or defines how often the dynamic data is provided to the controller 150. This may change as the vehicle is operated. Accordingly, the dynamic information module 206 is structured to update or trigger an update by sending an alert to the dynamic external information source in advance of the vehicle travelling a certain location. Like the static information module 205, the dynamic information module 206 may include communication circuitry (e.g., relays, wiring, etc.) or other communication devices that facilitate the acquisition and reception of the external dynamic information 230. In another embodiment, the dynamic information module 206 may include machine readable content for facilitating the acquisition and reception of the external static information 230. In yet another embodiment, the dynamic information module 206 may include any combination of hardware (e.g., communication components) and machine-readable content.

In regard to either the external dynamic information or the external static information, both pieces may be received by each respective module 205 and 206 in advance of the vehicle 100 traveling a route or reaching a location. For example, if an operator designates a route for the vehicle 100, then the modules 205 and 206 may provide requests to the external static and dynamic information sources to receive the data at various points along the route. The external dynamic information may be periodically updated to account for changing conditions. If the operator does not designate a route, the modules 205 and 206, based on the current location and direction of travel of the vehicle 100, may utilize a relatively smaller window to request static and dynamic external information for locations/spots/positions that the vehicle 100 is likely to encounter. For example, if the operator is on a road with no turn-offs for two miles, the modules 205 and 206 can request dynamic and static external information for those two miles because the controller 150 may determine that the vehicle 100 must continue on this path. If the vehicle is in a busy area in a metropolitan area where one of several different routes may be traversed at any moment, the modules 205 and 206 may employ a region or zone of interest for acquiring external static and dynamic information (e.g., a two square mile radius or any predefined radius about the vehicle). The received data may then be correlated or associated with wherever the operator chooses to direct the vehicle 100 within that two square mile zone of interest. This zone of interest may then move with the vehicle 100. Of course, it should be understood that the present disclosure contemplates other techniques, methods, and strategies that may be used to control the frequency of external dynamic and static data providing based on location, such that all possible strategies are intended to fall within the spirit and scope of the present disclosure.

The battery SOC module 210 is structured to receive data indicative of the battery 107 and control operation of the battery 107. In one embodiment, the battery SOC module 210 includes the battery 107 and any other hardware components associated with the electrified powertrain (e.g., sensors, etc.). Accordingly, in some embodiments, the battery SOC module 210 may include a battery monitoring system. In another embodiment, the battery SOC module 210 includes communication circuitry to provide one or more commands to the battery 107 or charging/discharging controller operatively attached thereto. In yet another embodiment, the battery SOC module 210 includes machine-readable content for facilitating the reception and provision of various commands to control the battery 107 SOC.

To determine the battery SOC, the battery SOC module 210 may use any conventional technique (e.g., coulomb counting, etc.). Further, the battery SOC module 210 may manage the SOC of the battery 107 via any technique, such as controlling the charging current and voltage provided to the battery 107 (e.g., from regenerative braking, an alternator, another energy capture device or electrical energy providing device, etc.). Moreover, the battery SOC module 210 may also control other electrified accessories in the vehicle 100 in order to manage the SOC of the battery 107 (e.g., reduce electrical energy consumption from pre-designated non-critical components in order to conserve energy for an upcoming maneuver, etc.). As shown, the battery SOC module 210 is structured to receive a determined vehicle propulsion power from the transmission module 207 and, in response, determine a battery SOC to achieve a desired operating condition (e.g., to avoid a transmission shift), and provide a command to facilitate the determined battery SOC with the battery 107.

Turning now to the transmission module 207, as shown, the transmission module 207 is structured to receive the internal information, external static information, and external dynamic information from each of the internal information module 204, static information module 205, and dynamic information module 206, respectively. In response, the transmission module 207 is structured to selectively control one or more powertrain components, namely the transmission 102, via management of the battery 107 via the battery SOC module 210. In one embodiment, the transmission module 207 may include the transmission 102 itself and a controller therefor (e.g., a transmission controller, etc.). In another embodiment, the powertrain component module 207 may include machine-readable content for controlling and managing the one or more powertrain components, such as the transmission 102. In yet another embodiment, the powertrain component module 207 may include any combination of powertrain components and machine-readable content.

As mentioned above, in certain embodiments, the transmission module 207 is structured to generate and provide control commands based on one or more objective functions. That is to say, the transmission module 207 is structured to transmit, deliver, and/or provide commands that facilitate achievement of one or more desired operating characteristics of the vehicle. For example, if the operator provides a desire to minimize fuel economy, the transmission module 207 may manage the battery SOC to reduce a number of transmission shifts because typically the greater or more frequent transmission results in a relatively worse fuel economy. In another example, if the desired operating parameter is to minimize fuel emissions, the powertrain component module 207 may manage the battery SOC to provide additional power during high load periods to reduce the strain on the engine 101 and, subsequently, the fuel consumption and emissions amount.

In operation, based on the external static information, external dynamic information, and internal information, the transmission module 207 is structured to determine a load on the vehicle (or, analogously, a power to propel the vehicle) at, at least one of a current location and a potential future location for the vehicle. Based on the determined load, the transmission module 207 is structured to determine the power output needed or substantially needed to overcome the determined load. To determine the load on the vehicle, or an estimated or predicted load on the vehicle, the transmission module 207 may utilize one or more formulas, algorithms, processes, and the like for determining load. One such example set of formulas are shown below:

$$P_{propulsion} = P_{eng-out} = P_{aero} + P_{drag} + P_{gravity} + P_{accl} + P_{loss} \quad \text{Equation (1)}$$

In Equation (1), the power consumed for propelling a vehicle $P_{propulsion}$, is equivalent to the power from the engine 101, $P_{eng-out}$. $P_{aero}$ refers to the aerodynamic power; $P_{drag}$ refers to the power needed or substantially needed to overcome wheel drag (e.g., from road and tire interactions); $P_{accl}$ refers to the power to support acceleration of the vehicle; and, $P_{loss}$ refers to the losses that may occur and that may need to be accounted for when determining the power to propel the vehicle at various locations.

$$P_{aero} = \left(\frac{A \cdot C_D \cdot \rho \cdot u^2}{2}\right) \cdot u \quad \text{Equation (2)}$$

In Equation (2), $A \cdot C_D$ is the vehicle aerodynamic drag area (A) times the aerodynamic drag coefficient ($C_D$), which is a measure of aerodynamic resistance of a cross-sectional area. The term $\rho$ is the air density, and the term u is the velocity or speed of the vehicle 100. The power to overcome wheel drag ($P_{drag}$) may be calculated using Equation (3).

$$P_{drag} = [(C_{rr-dyn})(m \cdot g \cdot \cos \theta)(u)(C_{rr-static}) \\ (m \cdot g \cdot \cos \theta)](u) \quad \text{Equation (3)}$$

The term $C_{rr-dyn}$ is the wheel dynamic rolling resistance and the term $C_{rr-static}$ is the wheel static rolling resistance. The term m is the mass of the vehicle 100, the term g is the acceleration due to gravity, and the term $\theta$ is a road slope. Equation (3) may be simplified to the form of Equation (4). The power required to overcome the force due to gravity ($P_{gravity}$) may be found from Equation (4), which uses previously defined terms.

$$P_{gravity} = (m \cdot g \cdot \sin \theta)(u) \quad \text{Equation (4)}$$

The power required to accelerate the vehicle 100 includes multiple components, including the power required to accelerate the vehicle alone ($P_{veh-accl}$), the power to accelerate the wheels 402 ($P_{whl-accl}$), the power required to accelerate the final drive 105 ($P_{FD-accl}$), the power required to accelerate the transmission 102 ($P_{TX-accl}$), and the power to accelerate the engine 101 ($P_{eng-accl}$). The calculation is shown in Equation (5).

$$P_{accl} = P_{veh-accl} + P_{whl-accl} + P_{FD-accl} + P_{TX-accl} + P_{eng-accl} \quad \text{Equation (5)}$$

Each of these terms may be individually calculated. The power required to accelerate the vehicle ($P_{veh-accl}$) may be found from the vehicle mass m, the vehicle acceleration a, and the vehicle velocity u, as shown in Equation (6).

$$P_{veh-accl} = m \cdot a \cdot u \quad \text{Equation (6)}$$

The power required to accelerate the wheels ($P_{whl-accl}$) may be found from $I_{whl}$, which is the inertia of wheels, $\dot{\omega}_{whl}$, which is the angular acceleration of the wheels, and $\omega_{whl}$, which is the angular velocity of the wheels, as shown in Equation (7).

$$P_{whl-accl} = I_{whl} \cdot \dot{\omega}_{whl} \cdot \omega_{whl} \quad \text{Equation (7)}$$

The power required to accelerate the final drive 105 ($P_{FD-accl}$) may be found from $I_{FD}$, which is the inertia of the final drive 105, $\dot{\omega}_{FD}$, which is the final drive angular acceleration, and $\omega_{FD}$, which is the final drive angular velocity, as shown in Equation (8).

$$P_{FD-accl} = I_{FD} \cdot \dot{\omega}_{FD} \cdot \omega_{FD} \quad \text{Equation (8)}$$

The power required to accelerate the transmission 102 ($P_{TX-accl}$) may be found from $I_{TX}$, which is the inertia of the transmission 102, $\dot{\omega}_{TX}$, which is the transmission angular acceleration, and $\omega_{TX}$, which is the transmission angular velocity, as shown in Equation (9).

$$P_{TX-accl} = I_{FD} \cdot \dot{\omega}_{TX} \cdot \omega_{TX} \quad \text{Equation (9)}$$

The power required to accelerate the engine 101 ($P_{eng-accl}$) may be found from $I_{Eng}$, which is the inertia of engine, $\dot{\omega}_{eng-out}$, which is the engine angular acceleration, and $\omega_{eng-out}$, which as mentioned above is the engine angular velocity, as shown in Equation (10).

$$P_{eng-accl} = I_{TX} \cdot \dot{\omega}_{eng-out} \cdot \omega_{eng-out} \quad \text{Equation (10)}$$

Each of the angular velocities and angular accelerations may be derived from data provided in the vehicle parameters in conjunction with the vehicle acceleration and velocity. The final term of Equation (1), $P_{loss}$, is a summary of the losses that need to be overcome in the vehicle 100. These losses may be summarized as in Equation (11).

$$P_{loss} = P_{FD-loss} + P_{TX-loss} + P_{eng-loss} \quad \text{Equation (11)}$$

The loss from the final drive 105 ($P_{FD-loss}$) may be calculated from $\Im(\omega_{FD-in} \cdot \tau_{FD-in})$, which may be found in a lookup table of the final drive torque loss, and $\omega_{FD-in}$, which is the angular velocity of the final drive at the input, as shown in Equation (12).

$$P_{FD-loss} = \Im(\omega_{FD-in} \cdot \tau_{FD-in}) \cdot \omega_{FD-in} \quad \text{Equation (12)}$$

The loss from the transmission 102 ($P_{TX-loss}$) may be calculated from $\Im(\omega_{TX-in} \cdot \tau_{TX-in})$, which may be found in a lookup table of the transmission torque loss, and $\omega_{TX-in}$, which is the angular velocity of the transmission at the input, as shown in Equation (13).

$$P_{TX-loss} = \Im(\omega_{TX-in} \cdot \tau_{TX-in}) \cdot \omega_{TX-in} \quad \text{Equation (13)}$$

The loss from the engine 101 may be calculated from $\Im(\omega_{eng-out})$, which is found in a lookup table of the engine torque loss, as shown in Equation (14).

$$P_{eng-Loss} = \Im(\omega_{eng-Out}) \cdot \omega_{eng-Out} \quad \text{Equation (14)}$$

The power consumed in propelling the vehicle 100 may now be shown in terms of all the powers required, as shown in Equation (15).

$$P_{eng-out} = P_{aero} + P_{drag} + P_{gravity} + (P_{veh-accl} + P_{whl-accl} + \\ P_{FD-accl} + P_{TX-accl} + P_{eng-accl}) + (P_{FD-loss} + P_{TX-loss} + \\ P_{eng-loss}) \quad \text{Equation (15)}$$

Even though $P_{eng-loss}$ is shown in Equation (15), it may be accounted for elsewhere. For example it may be integral to $P_{eng-out}$ and may not need to be explicitly included in Equation (15).

In accord with the above formulas, the transmission module 207 may utilize chosen speed targets at particular locations and times. These speed targets indicate a target vehicle speed (u) for the vehicle 100 at the particular location and time. The speed target may be predefined via an explicit input from an operator, based on the posted speed (e.g., the target speed could be the posted speed, +/−X relative to the posted speed, etc.), and/or based on external static and dynamic information (e.g., the average speed of the vehicle in the traffic jam five miles ahead, etc.).

It should be understood that the above formulas represent only one example methodology for determining the power to propel the vehicle 100. Further, these formulas may be represented in one or more look-up tables stored by the transmission module 207 to facilitate relatively fast determinations. In other embodiments, additional and/or different power determination methodologies may be employed with all such variations intended to fall within the scope of the present disclosure.

With an ability to determine the load (e.g., via the above formulas), the transmission module 207 may utilize the internal information from module 204 to determine the current load on the vehicle 100 (or, in other words, the current power to propel the vehicle at the current location). This may be based on an explicit load sensor, via a virtual sensor such as the use of the formulas above, and/or some combination therewith. However, because the transmission module 207 is structured to receive external static information and external dynamic information 220 and 230, the transmission module 207 may also determine, estimate, and/or predict a likely upcoming load on the vehicle 100. For example, the static information may indicate that in 0.5 miles, the road transitions from a relatively flat grade to a 3 percent grade. The transmission module 207 may then determine the likely load on the vehicle 100 in 0.5 miles based on this information. In another example, the static information 220 may indicate that the speed limit is about to in 0.5 miles decrease by 30 miles-per-hour while the grade stays constant. As such, the transmission module 207 may determine the likely new load or required power to propel the vehicle at the new speed limit (or some predefined acceptable variance relative to a posted speed limit) in this new location. While this external static information 220 may provide an indication of static conditions ahead of the vehicle 100, the external dynamic information 230 provides an indication of conditions that may affect the load or power determination based on time and location. For example, if the posted speed limit is 65 miles-per-hour, without the dynamic information, the transmission module 207 may determine the expected, predicted, or likely load at this speed limit. However, the dynamic information 230 may indicate an upcoming traffic jam such that the average speed of the vehicles is 15 miles-per-hour. Advantageously, the transmission module 207 may then determine the load or expected load based on this dynamic information. As a result of the internal, external static, and external dynamic, the transmission module 207 is able to relatively accurately determine the power to propel the vehicle 100 at various locations and at various times of travel.

Based at least partially on the determined load for each target speed, the transmission module 207 is structured to predict, determine, and/or estimate the likelihood of a potential shift event for the transmission 102. Typically, a shift schedule of the transmission is a function of the total engine load and the engine speed. In this regard, the transmission is typically only configured to support a certain load and speed at a certain setting due to primarily input to output ratios (e.g., engine crankshaft input to transmission shaft output). That is to say, for a specific vehicle speed, a transmission for a vehicle can only support that speed in certain settings. Accordingly, based on the vehicle speed target at that location and time, the transmission module 207 may determine which transmission settings may support that power output. The transmission module 207 whether these one or more transmission settings differ from the current transmission setting. If so, the transmission module 207 may conclude that a potential shift event is likely. If not, the transmission module 207 may conclude that a potential shift event at the particular location and time is unlikely. If there are only two potential transmission settings one of which corresponding to the current setting, the transmission module 207 may still conclude there is a potential for a shift event.

Based on determined likelihood of a potential shift event, the transmission module 207 is structured to selectively control the battery 107 SOC via the battery SOC module 210 to, for example, enhance operation of the vehicle and/or meet or substantially meet one or more desired operating parameters (e.g., avoid a shift event, reduce the frequency of shift events, etc.). To aid explanation, this functionality is described in regard to the transmission 102. Accordingly, as shown the transmission module 207 includes a transmission module having a shift module 208. The shift module 208 is structured to control shift events (for an automatic transmission vehicle) and/or facilitate control of shift events (for a manual transmission by, e.g., providing a notification such as shift to X gear via the I/O device 140).

Based on the foregoing, an example operational process may be described as follows. The transmission module 207 may determine a current power to propel the vehicle. Based on at least one of the static and dynamic information, the transmission module 207 may determine that the vehicle 100 is about to encounter an uphill grade, such that if the same speed is continued, the load may increase. Accordingly, the transmission module 207 may determine that a shift event is likely. In response, the transmission module 207 may provide the determined difference in power to the battery SOC module 210. The battery SOC module 210 determines a power output needed or likely needed to make up the difference assuming that the present transmission setting is unchanged (e.g., to alleviate the need for the shift event, reduce the frequency of shift events, etc.). The battery SOC module 210 may acquire data indicative of the current SOC and determine if that SOC is sufficient to make up the difference. If not, then the battery SOC module 210 may charge the battery using engine power and the motor generator by generating more power from the engine than demanded by the operator. Additionally, the battery SOC module 210 may reduce electronic power consumption from electronic accessories to increase the battery SOC to meet or substantially meet the determined SOC. As a result, the battery SOC module 210 may command the battery 107 to provide the determined power to the motor generator 106, such that a transmission shift, which would otherwise be required, is avoided. Advantageously, this operation may ease control of the vehicle 100 by the operator and reduce shift events which may reduce fuel consumption as well as minimize emissions.

In another example, the static information may indicate that the posted speed limit within a certain distance is about to increase to a certain speed limit. The shift module 208 may again withhold an otherwise required shift event by the battery SOC module 210 managing the battery SOC to have an amount of power to traverse that particular location at or near the certain speed limit. Of course, if the dynamic information indicates a change in operating conditions that may affect the propulsion power determination, the transmission module 207 may determine the adjusted propulsion power to facilitate a determination by the battery SOC module 210 of the adjusted SOC that is likely needed. In turn, the battery SOC module 210 may facilitate achieving this adjusted SOC.

As one of ordinary skill in the art will appreciate, the aforementioned examples are only two control examples using the battery SOC to selectively provide motive force from the motor generator 106 to enhance vehicle operation. The same or similar principles and methodologies may readily be applied with similar type examples.

While the aforementioned modules facilitate the dynamic response ability of the controller 150 to account for changing loads on the vehicle via battery SOC management, similar principles may be applied to the diagnostic and prognostics of the vehicle 100. More particularly, the diagnostic module 209 is structured to receive internal vehicle information indicative of one or more diagnostic conditions for one or more powertrain components, determine that one or more powertrain components are likely to fail (e.g., operating below a predefined healthy threshold, etc.), and provide this determination to the battery SOC module 210. In response, the battery SOC module 210 is structured to manage the battery SOC to reduce demand on the one or more powertrain components. For example, if the diagnostic module 209 determines that the transmission 102 is likely to experience a fail condition, the diagnostic module 209 provides this data to the battery SOC module 210. The battery SOC module 210 may charge the battery via the engine by increasing the engine power above the drive demand to maintain a relatively high SOC of the battery 107 in order to have a relatively high boost of energy from the motor generator 106 on-demand. That is to say, the battery SOC may now avoid the need for shift events that can adversely affect or causally implicate the fail condition. Advantageously, management of the powertrain component (in this case, the transmission) via the SOC may reduce wear, tear, demand, and strain on the component to increase its useful life and substantially prevent failure.

Figure 3:
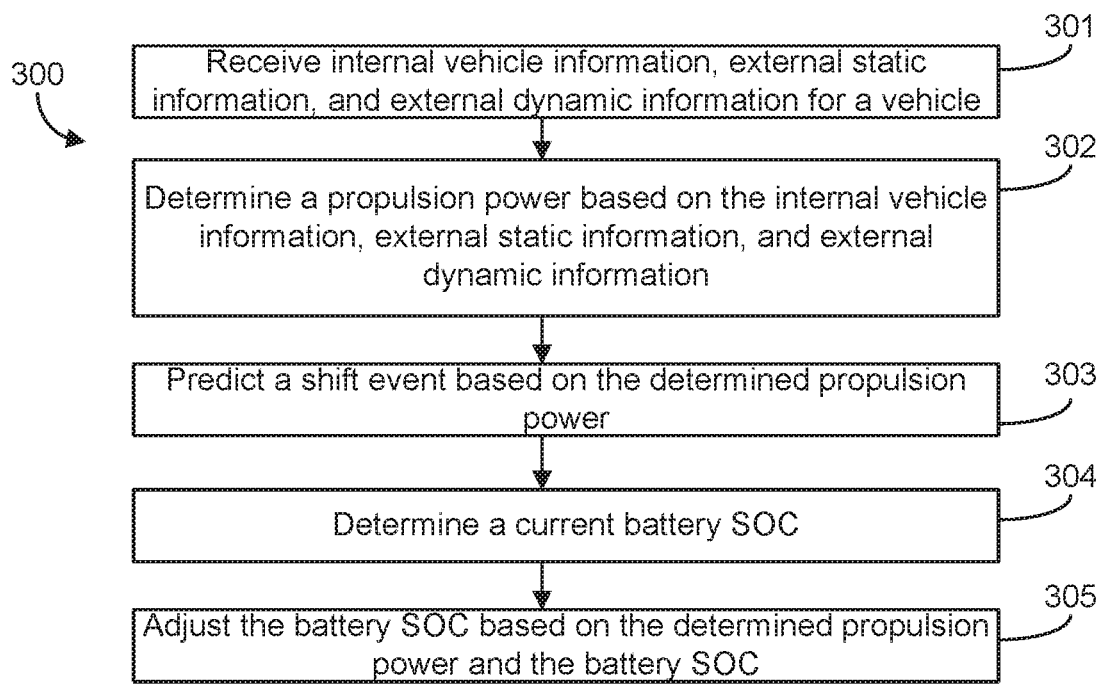
FIG. 3 is a flow diagram of a method of managing a battery state of charge in response to a predicted shift event for a transmission of a vehicle, according to an example embodiment.

Referring now to FIG. 3, a flow diagram of a method of controlling a transmission via management of an electric motor in a vehicle is shown according to one embodiment. Because method 300 may be implemented with the controller 150 and in the system 50, reference may be made to one or more features of the controller 150 and the system 50 to explain method 300.

At process 301, internal vehicle information, external static information, and external dynamic information for a vehicle is received. The internal vehicle information, external static information, and external dynamic information may have the same definition as described herein above.

At process 302, a propulsion power for the vehicle is predicted based on the internal vehicle information, external static information, and external dynamic information. This process may be implemented at one or more locations and at one or more times of travel for the vehicle 100. In response to the determined propulsion power, a need for a potential shift event may be predicted (process 303). This may be determined based on the principles described above (e.g., For a target speed at a particular location and time, the transmission module 207 may determine the load or propulsion power. In turn, the transmission module 207 may determine the transmission settings that could support that propulsion and compare the determined transmission settings to the current setting. If there is a difference (e.g., the current setting is $2^{nd}$ gear and the determined settings correspond with $3^{rd}$ and $4^{th}$ gear), the transmission module 207 may determine that a likelihood for a shift event exists). Contemporaneously, the transmission module 207 may determine the current power consumption and a difference relative to the power consumption needed or substantially needed to propel the vehicle based on the determined upcoming shift event.

At process 304, a battery SOC is determined for vehicle. In this regard, the SOC may be determined using any piece of battery data and via any process, as described above in regard to the battery SOC module 210 (e.g., coulomb counting).

At process 305, the battery SOC is adjusted (e.g., via the battery SOC module 210) based on the determined propulsion power and the battery SOC. In one embodiment, the battery SOC may be adjusted to avoid the otherwise required or predicted shift event for the transmission. For example, if the load is determined to increase at a certain point in the future thereby likely requiring a downshift, the battery SOC module 210 is structured to adjust the battery SOC to facilitate power from the motor generator 106 to propel the vehicle to avoid the shift event. Of course, if an objective function is applied to process 300, the battery SOC may be managed to achieve one or more desired operating characteristics of the vehicle (e.g., minimize fuel consumption by reducing transmission shifts, etc.). In this regard, the battery SOC module 210 may determine the SOC needed or likely needed for the battery 107 to achieve the predefined objective.

Figure 4:
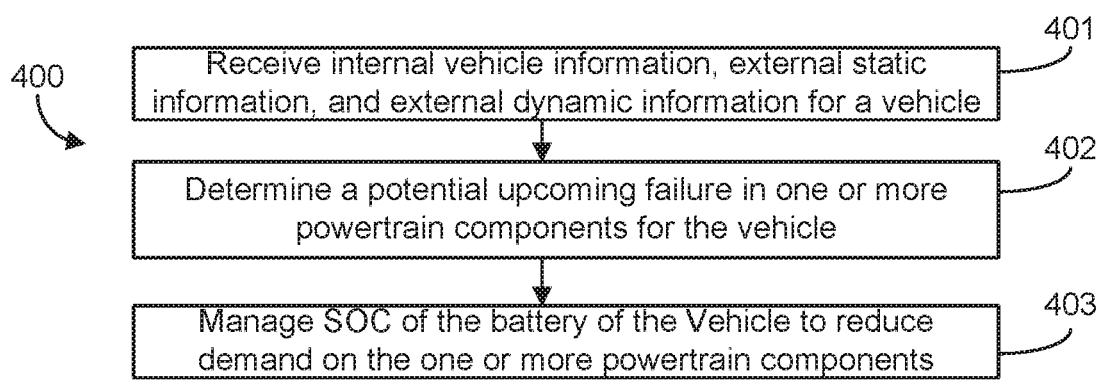
FIG. 4 is a flow diagram of a method of managing a battery state of charge in a vehicle to reduce wear, tear, and/or strain on a component of a powertrain system for the vehicle, according to an example embodiment.

While process 300 facilitates using the battery SOC to adjust to changing acceleration demands in advanced of traveling a particular route, the principles disclosed herein may also be applied to diagnostics and prognostics of the powertrain. Referring now to FIG. 4, a flow diagram of a method of managing a battery SOC in a vehicle to reduce wear, tear, and/or strain on a component of a powertrain system of a vehicle is shown, according to one embodiment. While process 400 relates to managing battery SOC to meet acceleration demands and, in particular, to avoid or manage transmission shift events, process 400 particularly relates to managing the battery SOC to reduce strain on one or more powertrain components, such as the transmission. Advantageously, process 400 facilitates the life cycle management as well as wear and tear aggregation for the one or more powertrain components.

At process 401, internal vehicle information, external static information, and external dynamic information for a vehicle is received. The interval vehicle information, external static information, and external dynamic information may have the same definition as described herein above.

At process 402, a potential upcoming failure for one or more powertrain components for the vehicle is determined (e.g., via diagnostic module 209). In this regard, the diagnostic module 209 may receive the internal vehicle information, which includes such information like fault codes or diagnostic trouble codes to at least one of predict, estimate, or determine the health of one or more powertrain components, such as the transmission. In this regard, the diagnostic module 209 may examine operational characteristic of the transmission relative to predefined healthy and/or symptomatic transmissions to determine the efficacy of the transmission.

At process 403, if one or more components are determined to have a potential for upcoming failure, the battery SOC for the vehicle is adjusted. For example and in regard to the transmission, the battery SOC module 210 may utilize the internal and external dynamic and static information to determine the propulsion power at various points along a route. Based on internal information, the transmission module 207 may determine a current propulsion power at or before locations or times that may cause or implicate a transmission shift event. As a result, the battery SOC module 210 may manage the battery SOC to ensure or substantially ensure the battery has a sufficient SOC to avoid or likely avoid the need for a transmission shift event. As a result, the battery SOC module 210 may effectively reduce the wear and tear caused by transmission shift events on the transmission. Advantageously, this operation may increase the life of the powertrain component, which in this example is the transmission. However, as mentioned above, the same or similar principles may also be applicable with other powertrain components, such as the engine.

It should be understood that no claim element herein is to be construed under the provisions of 35 U.S.C. § 112(f), unless the element is expressly recited using the phrase "means for." It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIG. 1) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. An apparatus, comprising:
   a transmission circuit communicably coupled to at least one of an internal information circuit, an external static information circuit, and an external dynamic information circuit, wherein the transmission circuit is structured to:
      determine a current propulsion power of a hybrid vehicle at a current location;
      determine a potential propulsion power for the hybrid vehicle at a particular location ahead of the current location on a route of the hybrid vehicle based on information from the at least one of the internal information circuit, the external static information circuit, and the external dynamic information circuit; and
      predict a transmission shift event for a transmission of the hybrid vehicle at the particular location based on a difference between the current propulsion power and the potential propulsion power; and
   a battery state of charge circuit communicably coupled to the transmission circuit, wherein the battery state of charge circuit is structured to:
      monitor a state of charge of a battery of the hybrid vehicle;
      in response to the transmission circuit predicting the transmission shift event for the transmission:
         determine a current state of charge of the battery based on the state of charge of the battery at the current location; and
         determine that the current state of charge is insufficient to provide the difference between the current propulsion power and the potential propulsion power at the particular location without requiring the transmission shift event; and
      in response to determining that the current state of charge is insufficient to provide the difference between the current propulsion power and the potential propulsion power at the particular location without requiring the transmission shift event, increase the state of charge of the battery of the hybrid vehicle such that the state of charge of the battery becomes sufficient when arriving at the particular location to facilitate meeting the potential propulsion power at the particular location without requiring the transmission shift event for the transmission of the hybrid vehicle.

2. The apparatus of claim 1, wherein the transmission circuit is structured to predict the transmission shift event based on external static information from the external static information circuit indicating a road grade change at the particular location relative to the current location of the hybrid vehicle and, in response, the battery state of charge circuit is structured to manage the state of charge of the battery to control a motor generator of the hybrid vehicle to generate and provide a propulsion power for the hybrid vehicle to eliminate a need for the predicted transmission shift event.

3. The apparatus of claim 1, wherein the transmission circuit is structured to predict the transmission shift event based on external dynamic information from the external dynamic information circuit at the particular location at a particular time.

4. The apparatus of claim 1, wherein the transmission circuit is structured to predict the transmission shift event based on external static information from the external static information circuit indicating a road speed limit change at the particular location at a particular time relative to the current location for the hybrid vehicle and, in response, the battery state of charge circuit is structured to manage the state of charge of the battery to control a motor generator of the hybrid vehicle to generate and provide a propulsion power for the hybrid vehicle to eliminate a need for the predicted transmission shift event.

5. The apparatus of claim 1, wherein in response to predicting the transmission shift event at the particular location at a particular time, the battery state of charge circuit is structured to manage the state of charge of the battery to control a motor generator of the hybrid vehicle to generate and provide a propulsion power for the hybrid vehicle to eliminate a need for the predicted transmission shift event at the particular location and at the particular time.

6. The apparatus of claim 1, wherein the battery state of charge circuit is structured to manage the state of charge of the battery to affect a power output from a motor generator of the hybrid vehicle to generate the potential propulsion power at the particular location at a particular time without changing the current propulsion power output of the hybrid vehicle.

7. The apparatus of claim 1, wherein the battery state of charge circuit is structured to manage the state of charge of the battery via at least one of managing activation and deactivation of an electric motor operatively coupled to the battery and managing charging of the battery from a charging source, wherein the charging source includes at least one of a regenerative braking source and an engine driven generator/alternator source.

8. The apparatus of claim 1, wherein internal information from the internal information circuit includes at least one of a current vehicle speed, a current transmission setting, a current load on the hybrid vehicle, a throttle position, a cruise control speed set speed, a fluid consumption rate, a temperature of the battery, an efficiency of the battery, an efficiency of a motor generator, a current terrain grade, a battery state of health, an accessory state, or a state of charge of the battery;
  wherein external static information from the external static information circuit includes at least one of a road grade at the particular location, a posted speed limit at the particular location, an elevation at the particular location, a curvature at the particular location, an indication of traffic control signs at the particular location, or an indication of a presence of an intersection at the particular location; and
  wherein external dynamic information from the external dynamic information circuit includes at least one of a traffic density at the particular location at a particular time, a weather condition at the particular location at the particular time, or dynamic road speed limits in speed zones.

9. A method, comprising:
  monitoring, by a controller of a hybrid vehicle, a state of charge of a battery of the hybrid vehicle;
  determining, by the controller, a current propulsion power of the hybrid vehicle at a current location;
  determining, by the controller, a future propulsion power for the hybrid vehicle at a particular location ahead of the current location based on at least one of internal hybrid vehicle information, external static information, and external dynamic information;
  predicting, by the controller, a potential shift event for a transmission of the hybrid vehicle at the particular location based on a difference between the current propulsion power and the future propulsion power;
  in response to the predicting the potential shift event for the transmission:
    determining, by the controller, a current state of charge of the battery based on the state of charge of the battery at the current location, wherein the battery is operatively coupled to an electric motor in the hybrid vehicle; and
    determining, by the controller, that the current state of charge is insufficient to provide the difference between the current propulsion power and the future propulsion power at the particular location without requiring the potential shift event; and
  in response to determining that the current state of charge is insufficient to provide the difference between the current propulsion power and the future propulsion power at the particular location without requiring the potential shift event, increasing, by the controller, the state of charge of the battery such that the state of charge of the battery becomes sufficient when arriving at the particular location to eliminate a need for the potential shift event at the particular location.

10. The method of claim 9, wherein the internal hybrid vehicle information includes at least one of a current hybrid vehicle speed, a current transmission setting, a current load on the hybrid vehicle, a fluid consumption rate, a temperature of the battery, an efficiency of the battery, a current terrain grade, a battery state of health, an accessory state, or a state of charge of the battery.

11. The method of claim 9, wherein the external static information includes at least one of a road grade at the particular location, a posted speed limit at the particular location, an elevation at the particular location, a curvature at the particular location, an indication of traffic control signs at the particular location, or an indication of a presence of an intersection at the particular location.

12. The method of claim 9, wherein the external dynamic information includes at least one of a traffic density at the particular location at a particular time or a weather condition at the particular location at the particular time.

13. The method of claim 9, further comprising:
  determining, by the controller, a potential failure condition in one or more powertrain components of the hybrid vehicle; and
  managing, by the controller, the state of charge of the battery during operation of the hybrid vehicle to reduce a usage of the one or more powertrain components.

14. The method of claim 13, wherein the potential failure condition is determined based on one or more diagnostic trouble codes.

15. A system, comprising:
  a battery for use in a hybrid vehicle; and
  a controller communicably and operatively coupled to the battery, the controller structured to:
    monitor a state of charge of the battery;
    determine a current propulsion power of the hybrid vehicle at a current location;
    determine a future propulsion power for the hybrid vehicle at a particular location ahead of the current location based on at least one of internal hybrid vehicle information, external static information, and external dynamic information;
    predict a potential transmission shift event for a transmission of the hybrid vehicle at the particular location based on a difference between the current propulsion power and the future propulsion power;
    in response to the predicting the potential transmission shift event for the transmission:
      determine a current state of charge of the battery based on the state of charge of the battery at the current location;
      determine an estimated state of charge of the battery at the particular location based on the current state of charge and vehicle operations between the current location and the particular location; and
      determine that the estimated state of charge of the battery is insufficient to provide the difference between the current propulsion power and the future propulsion power at the particular location without requiring the potential transmission shift event; and
    in response to determining that the estimated state of charge is insufficient, manage the state of charge of the battery such that the state of charge of the battery is sufficient when arriving at the particular location to facilitate skipping the potential transmission shift event at the particular location.

16. The system of claim 15, wherein the controller is structured to predict the potential transmission shift event based on the external static information indicating a road grade change at the particular location relative to the current location of the hybrid vehicle.

17. The system of claim 15, wherein the controller is structured to predict the potential transmission shift event based on the external static information indicating a road speed limit change at the particular location at a particular time relative to the current location of the hybrid vehicle.

18. The system of claim 15, wherein the controller is structured to determine a potential failure condition in one or more powertrain components of the hybrid vehicle, and manage the state of charge of the battery during operation of the hybrid vehicle to reduce a usage of the one or more powertrain components.

19. The system of claim 15, wherein the controller is structured to manage the state of charge of the battery by operating an engine of the hybrid vehicle to provide a greater power output from the engine than is currently demanded at the current location to drive a generator of the hybrid vehicle to charge the battery to increase the state of charge of the battery.

20. The system of claim 15, wherein the controller is structured to manage the state of charge of the battery by reducing electric power consumption from the battery by electrically-operated components of the hybrid vehicle between the current location and the particular location.

* * * * *